US010216561B2

United States Patent
Karsidag et al.

(10) Patent No.: US 10,216,561 B2
(45) Date of Patent: Feb. 26, 2019

(54) MONITOR PERFORMANCE ANALYSIS

(71) Applicant: Bombardier Inc., Dorval (CA)

(72) Inventors: Suleyman Tarkan Karsidag, Pointe-Claire (CA); Philippe Desy, Prévost (CA)

(73) Assignees: C SERIES AIRCRAFT LIMITED PARTNERSHIP, Mirabel (CA); BOMBARDIER INC., Montreal (CA)

( * ) Notice: Subject to any disclaimer, the term of this patent is extended or adjusted under 35 U.S.C. 154(b) by 130 days.

(21) Appl. No.: 15/305,419

(22) PCT Filed: Apr. 20, 2015

(86) PCT No.: PCT/IB2015/052875
§ 371 (c)(1),
(2) Date: Oct. 20, 2016

(87) PCT Pub. No.: WO2015/162541
PCT Pub. Date: Oct. 29, 2015

(65) Prior Publication Data
US 2017/0039101 A1 Feb. 9, 2017

Related U.S. Application Data

(60) Provisional application No. 61/984,285, filed on Apr. 25, 2014.

(51) Int. Cl.
*G06F 11/07* (2006.01)
*G05B 23/02* (2006.01)
(Continued)

(52) U.S. Cl.
CPC ...... *G06F 11/0754* (2013.01); *G05B 23/0213* (2013.01); *G05B 23/0218* (2013.01);
(Continued)

(58) Field of Classification Search
CPC ............................ G06F 11/07; G06F 11/0754
(Continued)

(56) References Cited

U.S. PATENT DOCUMENTS 4,592,055 A * 5/1986 Fischer ................ G05D 1/0077
244/194
4,599,698 A * 7/1986 Fischer ................ G05D 1/0858
244/194
(Continued)

OTHER PUBLICATIONS

PCT international Search Report and Written Opinion dated Oct. 2, 2015 re: International Application No. PCT/IB2015/052875.

*Primary Examiner* — Kamini B Patel
(74) *Attorney, Agent, or Firm* — Norton Rose Fulbright Canada LLP

(57) ABSTRACT

A system includes a processor and a memory system in communication with the processor. The memory system stores instructions that when executed by the processor result in the system being operable to identify a system hazard boundary of a monitored system and a system nuisance boundary of the monitored system. The system is also operable to determine a must-trip condition based on the system hazard boundary and a must-not-trip condition based on the system nuisance boundary. The system is further operable to output a protection margin for the monitored system based on the system hazard boundary and a difference between the must-trip condition and the must-not-trip condition.

35 Claims, 6 Drawing Sheets

(51) Int. Cl.
*G06F 11/30* (2006.01)
*G06F 11/34* (2006.01)

(52) U.S. Cl.
CPC ........ *G06F 11/079* (2013.01); *G06F 11/0739* (2013.01); *G06F 11/0772* (2013.01); *G06F 11/3013* (2013.01); *G06F 11/3409* (2013.01)

(58) Field of Classification Search
USPC ...................................... 714/47.2; 701/1, 12
See application file for complete search history.

(56) References Cited

U.S. PATENT DOCUMENTS

| | | | | |
|---|---|---|---|---|
| 5,710,776 | A * | 1/1998 | Tomlinson | G05B 9/03 375/229 |
| 2001/0042229 | A1* | 11/2001 | James | G01D 3/08 714/48 |
| 2004/0255013 | A1* | 12/2004 | Ott | G05B 9/03 709/223 |
| 2009/0082954 | A1* | 3/2009 | Ridenour, II | G01C 23/005 701/467 |
| 2016/0055685 | A1* | 2/2016 | Lilly | G07C 5/0808 701/1 |

\* cited by examiner

MONITOR PERFORMANCE ANALYSIS

CROSS-REFERENCE TO RELATED APPLICATION(S)

This application is a national phase application under 35 U.S.C. 371 of International Patent Application No. PCT/IB2015/052875 filed on Apr. 20, 2015, which claims priority from U.S. Provisional Patent Application Ser. No. 61/984,285, filed on Apr. 25, 2014, the entire content of which is incorporated herein by reference.

FIELD OF THE INVENTION

The present invention relates in general to performance analysis of monitors in a system, and in particular to a performance analysis tool, that measures robustness and failure detection capabilities of monitors in a system.

BACKGROUND OF THE INVENTION

In a complex system, such as an aircraft, monitors are typically used to ensure that the system is operating as expected. When a monitor detects an undesirable result, the monitor can trigger a message or other event. Results of monitors may also be used to change an operating condition of the system, such as disabling a component or subsystem and switching to a backup component or subsystem. For monitors to be effective, they must trip as expected to avoid exceeding potential hazard conditions, and only trip when required to avoid nuisance alerts. When a monitor trips but no fault is found upon further inspection, maintenance overhead is increased as the monitored system is analyzed in detail to attempt to locate a root cause of a non-existent issue.

In some instances, monitor limits used to trip monitors are selected by domain experts based on past experience. In other instances, monitor limits represent a fixed percentage of deviation relative to an expected value. A further alternative is to select a midpoint between a peak operating level and a hazard level. While a number of monitor limit selection techniques can be effective, they may not fully account for potential variations upon system integration. For example, sensor relocation, cable length changes, environmental conditions, transients, aging effects, manufacturing variations, accuracies, and cascaded components can impact actual monitor performance versus expected monitor performance. Selecting an unreasonably short confirmation time or an unreasonably tight tolerance on monitor limits can lead to nuisance alerts. Additionally, leaving monitors active when the monitored component or subsystem is not in an operative state can lead to nuisance alerts.

What is needed is an improved system and process to measure robustness and failure detection capabilities of monitors in a system, thereby quantitatively validating monitor performance or initiating a change process.

SUMMARY OF THE INVENTION

According to an embodiment of the present invention, a system includes a processor and a memory system in communication with the processor. The memory system stores instructions that when executed by the processor result in the system being operable to identify a system hazard boundary of a monitored system and a system nuisance boundary of the monitored system. The system is also operable to determine a must-trip condition based on the system hazard boundary and a must-not-trip condition based on the system nuisance boundary. The system is further operable to output a protection margin for the monitored system based on the system hazard boundary and a difference between the must-trip condition and the must-not-trip condition.

In an advantageous embodiment of the present invention, the system is further operable to conduct a tolerance stack-up at the must-trip condition to calculate a first estimation error.

In an advantageous embodiment of the present invention, the system is further operable to calculate a threshold protection limit based on a difference between the must-trip condition and the first estimation error.

In an advantageous embodiment of the present invention, the protection margin for the monitored system comprises a ratio of a difference between the threshold protection limit and a selected threshold divided by the difference between the must-trip condition and the must-not-trip condition.

In an advantageous embodiment of the present invention, the system is further operable to output a nuisance margin for the monitored system based on the system nuisance boundary and the difference between the must-trip condition and the must-not-trip condition.

In an advantageous embodiment of the present invention, the system is further operable to conduct a tolerance stack-up at the must-not-trip condition to calculate a second estimation error.

In an advantageous embodiment of the present invention, the system is further operable to calculate a threshold nuisance limit based on a difference between the must-not-trip condition and the second estimation error.

In an advantageous embodiment of the present invention, the nuisance margin for the monitored system comprises a ratio of a difference between the selected threshold and the threshold nuisance limit divided by the difference between the must-trip condition and the must-not-trip condition.

In an advantageous embodiment of the present invention, the system is further operable to perform a margin check of the selected threshold relative to the threshold protection limit and the selected threshold relative to the threshold nuisance limit.

In an advantageous embodiment of the present invention, the system is further operable to perform a design guidance check to confirm that a ratio of a difference between the selected threshold and the threshold nuisance limit divided by the second estimation error exceeds a minimum value.

In an advantageous embodiment of the present invention, the design guidance check further comprises confirming that a selected confirmation time exceeds a minimum confirmation value.

In an advantageous embodiment of the present invention, the design guidance check further comprises confirming that a difference between the protection margin and the nuisance margin is less than a margin difference threshold.

In an advantageous embodiment of the present invention, a corrective action is initiated based on a determination that one or more of the margin check and the design guidance check are not satisfied.

In an advantageous embodiment of the present invention, the corrective action is one of: a requirements change for the monitored system, a design change to the monitored system, or a reviewed and confirmed deviation.

In an advantageous embodiment of the present invention, the monitored system is a control system of an aircraft.

In an advantageous embodiment of the present invention, the system is further operable to confirm that a selected confirmation time for the monitored system is between a nuisance confirmation time limit and a protection confirmation time limit.

In an advantageous embodiment of the present invention, the system is further operable to record results for multiple monitored systems.

According to another embodiment of the present invention, a method for performance analysis of a monitor of a monitored system is disclosed. The method includes identifying a system hazard boundary of the monitored system and a system nuisance boundary of the monitored system. A must-trip condition is determined based on the system hazard boundary. A must-not-trip condition is determined based on the system nuisance boundary. A protection margin is output for the monitored system based on the system hazard boundary and a difference between the must-trip condition and the must-not-trip condition.

In an advantageous embodiment of the present invention, a tolerance stack-up is conducted at the must-trip condition to calculate a first estimation error.

In an advantageous embodiment of the present invention, a threshold protection limit is calculated based on a difference between the must-trip condition and the first estimation error.

In an advantageous embodiment of the present invention, the protection margin for the monitored system comprises a ratio of a difference between the threshold protection limit and a selected threshold divided by the difference between the must-trip condition and the must-not-trip condition.

In an advantageous embodiment of the present invention, a nuisance margin is output for the monitored system based on the system nuisance boundary and the difference between the must-trip condition and the must-not-trip condition.

In an advantageous embodiment of the present invention, a tolerance stack-up is conducted at the must-not-trip condition to calculate a second estimation error.

In an advantageous embodiment of the present invention, a threshold nuisance limit is calculated based on a difference between the must-not-trip condition and the second estimation error.

In an advantageous embodiment of the present invention, the nuisance margin for the monitored system comprises a ratio of a difference between the selected threshold and the threshold nuisance limit divided by the difference between the must-trip condition and the must-not-trip condition.

In an advantageous embodiment of the present invention, a margin check of the selected threshold is performed relative to the threshold protection limit and the selected threshold relative to the threshold nuisance limit.

In an advantageous embodiment of the present invention, a design guidance check is performed to confirm that a ratio of a difference between the selected threshold and the threshold nuisance limit divided by the second estimation error exceeds a minimum value.

In an advantageous embodiment of the present invention, the design guidance check further comprises confirming that a selected confirmation time exceeds a minimum confirmation value.

In an advantageous embodiment of the present invention, the design guidance check further comprises confirming that a difference between the protection margin and the nuisance margin is less than a margin difference threshold.

In an advantageous embodiment of the present invention, a corrective action is initiated based on a determination that one or more of the margin check and the design guidance check are not satisfied.

In an advantageous embodiment of the present invention, the corrective action is one of: a requirements change for the monitored system, a design change to the monitored system, or a reviewed and confirmed deviation.

In an advantageous embodiment of the present invention, the monitored system is a control system of an aircraft.

In an advantageous embodiment of the present invention, a selected confirmation time for the monitored system is confirmed to be between a nuisance confirmation time limit and a protection confirmation time limit.

In an advantageous embodiment of the present invention, results for multiple monitored systems are recorded.

According to yet another embodiment of the present invention, a computer program product is disclosed for performance analysis of a monitor of a monitored system. The computer program product includes a computer readable storage medium having program code embodied therewith, the program code readable/executable by a computer, processor or logic circuit to perform a method that includes identifying a system hazard boundary of the monitored system and a system nuisance boundary of the monitored system. A must-trip condition is determined based on the system hazard boundary. A must-not-trip condition is determined based on the system nuisance boundary. A protection margin is output for the monitored system based on the system hazard boundary and a difference between the must-trip condition and the must-not-trip condition.

In an advantageous embodiment of the present invention, a tolerance stack-up is conducted at the must-trip condition to calculate a first estimation error.

In an advantageous embodiment of the present invention, a threshold protection limit is calculated based on a difference between the must-trip condition and the first estimation error.

In an advantageous embodiment of the present invention, the protection margin for the monitored system comprises a ratio of a difference between the threshold protection limit and a selected threshold divided by the difference between the must-trip condition and the must-not-trip condition.

In an advantageous embodiment of the present invention, a nuisance margin is output for the monitored system based on the system nuisance boundary and the difference between the must-trip condition and the must-not-trip condition.

In an advantageous embodiment of the present invention, a tolerance stack-up is conducted at the must-not-trip condition to calculate a second estimation error.

In an advantageous embodiment of the present invention, a threshold nuisance limit is calculated based on a difference between the must-not-trip condition and the second estimation error.

In an advantageous embodiment of the present invention, the nuisance margin for the monitored system comprises a ratio of a difference between the selected threshold and the threshold nuisance limit divided by the difference between the must-trip condition and the must-not-trip condition.

In an advantageous embodiment of the present invention, a margin check of the selected threshold is performed relative to the threshold protection limit and the selected threshold relative to the threshold nuisance limit.

In an advantageous embodiment of the present invention, a design guidance check is performed to confirm that a ratio of a difference between the selected threshold and the threshold nuisance limit divided by the second estimation error exceeds a minimum value.

In an advantageous embodiment of the present invention, the design guidance check further comprises confirming that a selected confirmation time exceeds a minimum confirmation value.

In an advantageous embodiment of the present invention, the design guidance check further comprises confirming that a difference between the protection margin and the nuisance margin is less than a margin difference threshold.

In an advantageous embodiment of the present invention, a corrective action is initiated based on a determination that one or more of the margin check and the design guidance check are not satisfied.

In an advantageous embodiment of the present invention, the corrective action is one of: a requirements change for the monitored system, a design change to the monitored system, or a reviewed and confirmed deviation.

In an advantageous embodiment of the present invention, the monitored system is a control system of an aircraft.

In an advantageous embodiment of the present invention, a selected confirmation time for the monitored system is confirmed between a nuisance confirmation time limit and a protection confirmation time limit.

In an advantageous embodiment of the present invention, results for multiple monitored systems are recorded.

BRIEF DESCRIPTION OF THE DRAWINGS

The various embodiments of the present invention can be understood with reference to the following drawings. The components are not necessarily to scale. Also, in the drawings, like reference numerals designate corresponding parts throughout the several views.

DETAILED DESCRIPTION OF THE INVENTION

The present invention is more particularly described in the following description and examples that are intended to be illustrative only since numerous modifications and variations therein will be apparent to those skilled in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of." Furthermore, all ranges disclosed herein are inclusive of the endpoints and are independently combinable.

As used herein, approximating language may be applied to modify any quantitative representation that may vary without resulting in a change in the basic function to which it is related. Accordingly, a value modified by a term or terms, such as "about" and "substantially," may not to be limited to the precise value specified, in some cases. In at least some instances, the approximating language may correspond to the precision of calculating and/or storing the value.

In embodiments of the present invention, a selected threshold for a monitor of a monitored system is analyzed relative to a number of limits and conditions to determine whether the selected threshold is likely to have adequate failure detection performance and robustness. In general, failure detection of a monitor should result in correctly detecting the presence of a failure and tripping the monitor when the failure is detected. Monitor robustness of a monitor should result in no tripping of the monitor when the failure is not present. Failure detection performance of a monitor can be quantified by a protection margin, and robustness of the monitor can be quantified by a nuisance margin. Further details are provided herein regarding the calculation and use of the protection margin and the nuisance margin.

The foregoing and other features of various disclosed embodiments of the invention will be more readily apparent from the following detailed description and drawings of the illustrative embodiments of the invention wherein like reference numbers refer to similar elements.

Figure 1:
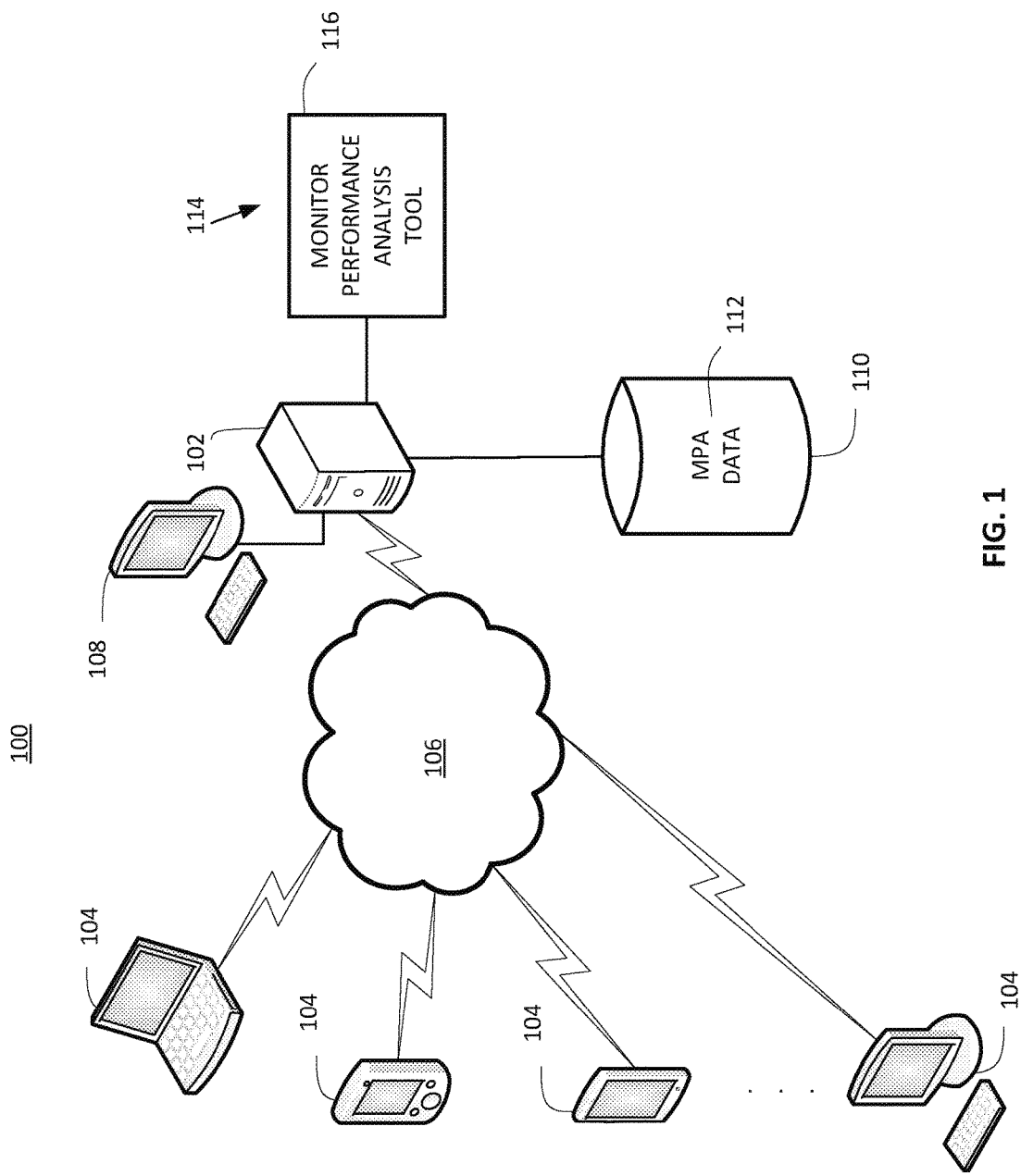
FIG. 1 is a block diagram of a system in accordance with an embodiment of the present invention.

Referring to FIG. 1, there illustrated is a block diagram of a portion of a system 100 that implements monitor performance analysis according to embodiments of the present invention. The system 100 represents a networked environment; however, it will be understood that non-networked embodiments are also contemplated. In the example depicted in FIG. 1, the system 100 includes a host system 102 that may be configured to communicate with one or more client systems 104 over a communication network 106. In exemplary embodiments, the host system 102 is a high-speed processing device (e.g., a mainframe computer, a desktop computer, a laptop computer, a hand-held device, an embedded computing device, or the like) including at least one processor (e.g., a computer processor or processing circuit) capable of reading and executing instructions, and handling interactions with various components of the system 100.

In exemplary embodiments, the client systems 104, each generally referred to as a client system 104, can include a variety of computing devices with processors and I/O interfaces, such as a keys/buttons, a touchscreen, and a display device. Embodiments of the client systems 104 can include a personal computer (e.g., a laptop, desktop, etc.), a portable device (e.g., a tablet PC, personal digital assistant, smart phone, etc.), or a network server-attached terminal. Alternatively, the client systems 104 can be omitted. The host system 102 and client systems 104 can include various computer/communication hardware and software technology known in the art, such as one or more processors or circuits, volatile and non-volatile memory including removable media, power supplies, network interfaces, support circuitry, operating systems, and the like. The host system 102 may also include one or more user interfaces 108 with user accessible I/O devices, such as a keyboard, mouse, and display to provide local access to the host system 102.

The communication network 106 may be any type of communications network known in the art. The communication network 106 can include a combination of wireless, wired, and/or fiber optic links. The communication network 106 may support a variety of known communication standards that allow data to be transmitted between the host system 102 and the client systems 104. Additional computer systems (not depicted) may also interface with the host system 102 and/or the client systems 104 via the communication network 106 or other networks.

In exemplary embodiments, the host system 102 is communicatively coupled to a storage device 110. The storage device 110 stores monitor performance analysis (MPA) data 112, which may include one or more files and/or databases. The storage device 110 may be implemented using memory contained in the host system 102, or the storage device 110 may be a separate physical device. It will be understood that multiple storage devices may be employed. For example, the storage devices may be dispersed across the communication network 106, and each of the storage devices may be logically addressable as a consolidated data source across a distributed environment that includes the communication network 106.

Information stored in the storage device 110 may be retrieved and manipulated via the host system 102. The data storage device 110 may generally store program instructions, code, and/or modules that, when executed by a processor, cause a particular machine to function in accordance with one or more embodiments described herein. The data storage device 110 depicted in FIG. 1 is representative of a class and/or subset of computer-readable media that are defined herein as "computer-readable memory" (e.g., non-transitory memory as opposed to transmission devices or media).

The host system 102 can execute one or more applications 114, including an MPA tool 116. In an alternate embodiment, the host system 102 provides the MPA tool 116 or portions thereof to be executed by one or more of the client systems 104. The MPA tool 116 can receive data input via the client systems 104, the one or more user interfaces 108, or the MPA data 112. Upon performing monitor performance analysis, the MPA tool 116 can output results to the client systems 104, the one or more user interfaces 108, or the MPA data 112. Instructions for executing the MPA tool 116 can be stored, for instance, in the storage device 110 and may be transferred to other locations in memory within the host system 102 or the client systems 104 for execution. Further details regarding the MPA tool 116 are provided herein.

Figure 2:
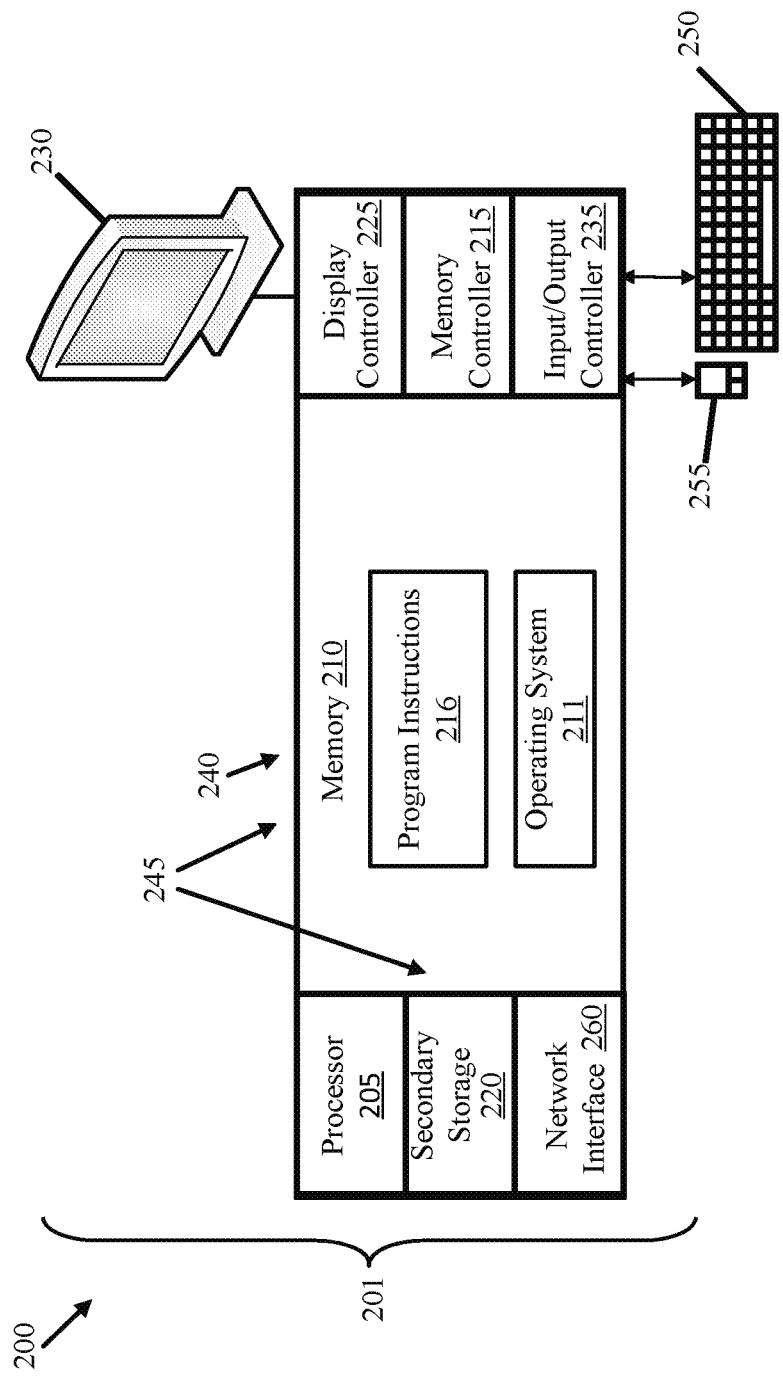
FIG. 2 is a block diagram of another system in accordance with an embodiment of the present invention.

FIG. 2 depicts a block diagram of a system 200 according to an embodiment. The system 200 is depicted embodied in a computer 201 in FIG. 2, such as a general-purpose computer, configured to perform monitor analysis. The system 200 is an example of the host system 102 of FIG. 1. The client systems 104 of FIG. 1 can also include similar computer elements as depicted in the computer 201 of FIG. 2.

In an exemplary embodiment, in terms of hardware architecture, as shown in FIG. 2, the computer 201 includes a processor 205 and a memory device 210 coupled to a memory controller 215 and an input/output controller 235. The input/output controller 235 can be, for example but not limited to, one or more buses or other wired or wireless connections, as is known in the art. The input/output controller 235 may have additional elements, which are omitted for simplicity, such as controllers, buffers (caches), drivers, repeaters, and receivers, to enable communications. Further, the computer 201 may include address, control, and/or data connections to enable appropriate communications among the aforementioned components.

In an exemplary embodiment, a conventional keyboard 250 and mouse 255 or similar devices can be coupled to the input/output controller 235. Alternatively, input may be received via a touch-sensitive or motion sensitive interface (not depicted). The computer 201 can further include a display controller 225 coupled to a display 230.

The processor 205 is a hardware device for executing software, particularly software stored in secondary storage 220 or memory device 210, where the memory device 210 and secondary storage 220 may be collectively referred to as a memory system 245 in communication with the processor 205. The processor 205 can be any custom made or commercially available computer processor, a central processing unit (CPU), an auxiliary processor among several processors associated with the computer 201, a semiconductor-based microprocessor (in the form of a microchip or chip set), a macro-processor, processing circuitry, or generally any device for executing instructions.

The memory device 210 of the memory system 245 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disc read only memory (CD-ROM), flash drive, disk, hard disk drive, diskette, cartridge, cassette or the like, etc.). Moreover, the memory device 210 may incorporate electronic, magnetic, optical, and/or other types of storage media. Accordingly, the memory device 210 is an example of a tangible computer readable storage medium 240 upon which instructions executable by the processor 205 may be embodied as a computer program product. The memory device 210 can have a distributed architecture, where various components are situated remote from one another, but can be accessed by the processor 205. Similarly, the secondary storage 220 of the memory system 245 can include nonvolatile memory elements and may be an embodiment of the storage device 110 of FIG. 1 to store the MPA data 112 of FIG. 1.

The instructions in the memory device 210 may include one or more separate programs, each of which comprises an ordered listing of executable instructions for implementing logical functions. In the example of FIG. 2, the instructions in the memory device 210 include a suitable operating system (OS) 211 and program instructions 216. The operating system 211 essentially controls the execution of other computer programs and provides scheduling, input-output control, file and data management, memory management, and communication control and related services. When the computer 201 is in operation, the processor 205 is configured to execute instructions stored within the memory device 210, to communicate data to and from the memory device 210, and to generally control operations of the computer 201 pursuant to the instructions. Examples of program instructions 216 can include instructions to implement the applications 114 of FIG. 1, such as the MPA tool 116 of FIG. 1, where the system 200 is an embodiment of the host system 102 of FIG. 1.

The computer 201 of FIG. 2 may also include a network interface 260 that can establish communication channels with one or more other computer systems via one or more network links, for instance in the communication network 106 of FIG. 1. The network interface 260 can support wired and/or wireless communication protocols known in the art. For example, when embodied in the host system 102 of FIG.

1, the network interface 260 can establish communication channels with one or more of the client systems 104 of FIG. 1.

Figure 3:
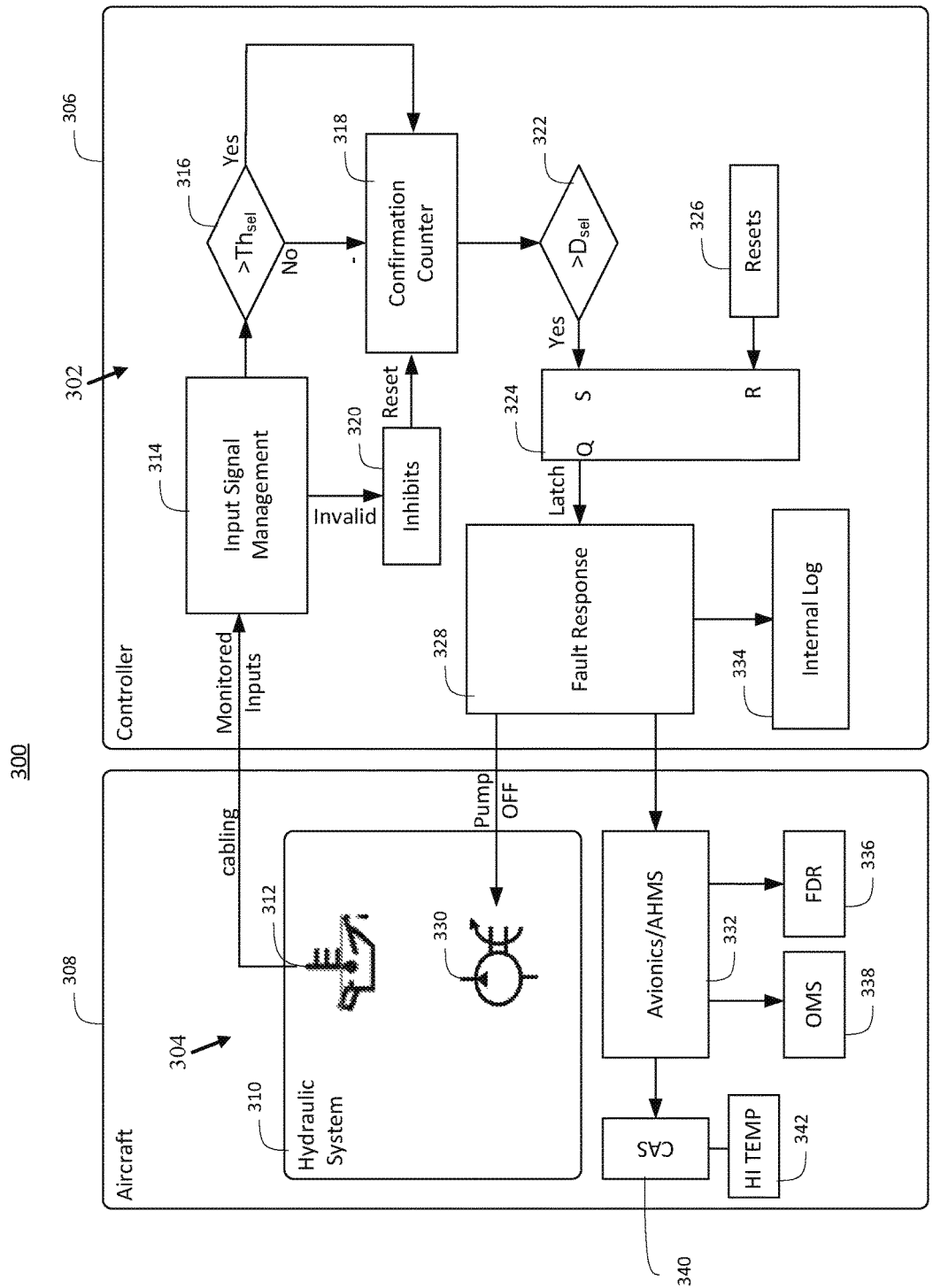
FIG. 3 is a block diagram of a monitor and a monitored system in accordance with an embodiment of the present invention.

Turning now to FIG. 3, a block diagram 300 of a monitor 302 and a monitored system 304 are depicted in accordance with an embodiment of the present invention. In the example of FIG. 3, the monitor 302 is part of a controller 306 for control systems of an aircraft 308, including a hydraulic system 310 as a control system of the aircraft 308. In this example, the hydraulic system 310 is the monitored system 304; however, it will be understood that the aircraft 308 includes numerous other systems (not depicted) that are also monitored by other monitors (not depicted). The hydraulic system 310 may include one or more sensors 312 that provide monitored inputs to input signal management 314 of the monitor 302. The monitor 302 can determine whether monitored inputs of the input signal management 314 exceed a selected threshold ($Th_{sel}$) 316, and if so, a confirmation counter 318 is incremented; otherwise, the confirmation counter 318 is decremented. If an invalid state is detected by the input signal management 314, e.g., a short circuit or open-circuit condition, inhibit logic 320 can reset the confirmation counter 318.

If the value of confirmation counter 318 is sufficiently large for a selected confirmation time ($D_{sel}$) 322, a latched fault 324 is set. The latched fault 324 may be reset based on a reset condition 326. The latched fault 324 can drive a fault response 328, which may include disabling a pump 330 of the hydraulic system 310 and sending a message to avionics and/or an aircraft health monitoring system (AHMS) 332. The fault response 328 can also trigger storage of a record in an internal log 334 of the controller 306. The avionics and/or AHMS 332 can log events to a flight data recorder (FDR) 336, an onboard maintenance system (OMS) 338, and/or a crew alerting system (CAS) 340. As one example, the CAS 340 can set a high temperature indicator 342 in the cockpit of the aircraft 308 as a result of the monitor 302 tripping with respect to the hydraulic system 310 as the monitored system 304. Therefore, it can be seen in this example that if the selected threshold 316 and/or the selected confirmation time 322 are not well selected such that a nuisance trip occurs, system effects can be observed when the pump 330 is disabled and numerous messages, records, and indications related to tripping of the monitor 302 may be produced.

Figure 4:
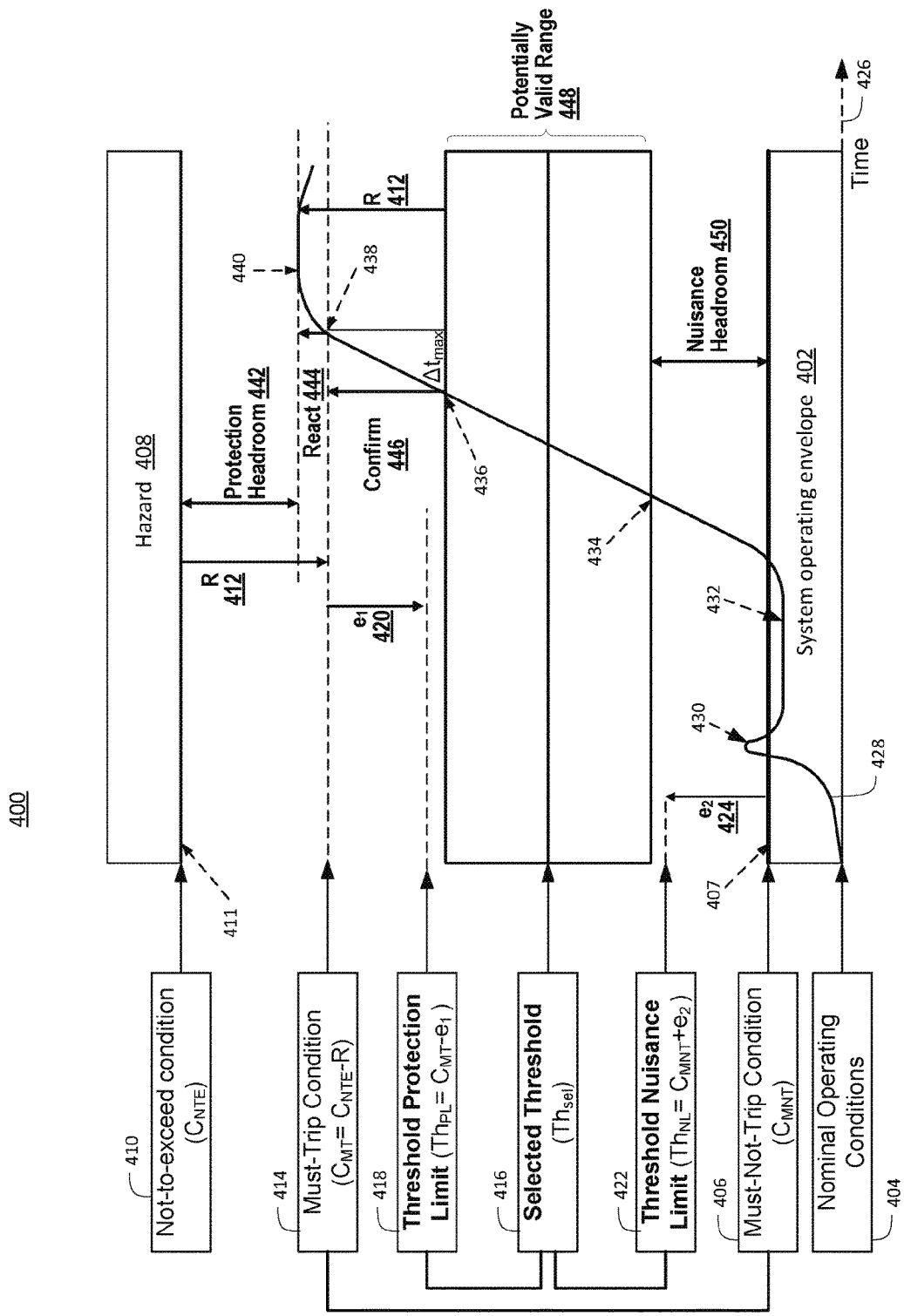
FIG. 4 is an example of various conditions and limits for a monitor in accordance with an embodiment of the present invention.

FIG. 4 is an example of various conditions and limits 400 for the monitor 302 of FIG. 3 in accordance with an embodiment of the present invention. In the example of FIG. 4, a system operating envelope 402 is defined between nominal operating conditions 404 and a must-not-trip condition ($C_{MNT}$) 406. The must-not-trip condition 406 represents a system limit under foreseeable extreme operating conditions (e.g., transients, aging, environmental effects). The must-not-trip condition 406 may be equivalent to a system nuisance boundary 407, where values below the system nuisance boundary 407 are within the system operating envelope 402 in the example of FIG. 4. A hazard level 408 is defined as all values above a not-to-exceed condition ($C_{NTE}$) 410. The not-to-exceed condition 410 may be equivalent to a system hazard boundary 411, where values at the hazard level 408 can produce an undesirable result, such as system or component damage. The system hazard boundary 411 defines design constraints for the monitor 302 of FIG. 3 to ensure detection and accommodation of failure effects even under worst case conditions. Further, the monitor 302 of FIG. 3, should trip early enough to ensure containment of system failure effects during confirmation and reaction (R) 412 before the hazard level 408 is reached. Therefore, a must-trip condition ($C_{MT}$) 414 is derived by removing the failure propagation effects during system confirmation and response (i.e., $C_{MT}=C_{NTE}-R$).

Although conditions 404, 406, 410, and 414 are defined in actual physical terms, controllers, such as the controller 306 of FIG. 3, operate within an uncertainty band defined by estimation errors inherent in the overall failure detection and accommodation mechanisms. System mechanical tolerances and sensor/controller accuracies are typical contributors to this estimation error to account for any foreseeable system operating conditions such as environmental and aging effects. Therefore, an estimation error stack-up analysis is performed to justify the actual protection performance ensured for a selected threshold ($Th_{sel}$) 416 that increments the confirmation counter 318 of FIG. 3 toward a monitor trip point 438, where the selected threshold 416 is an embodiment of the selected threshold 316 of FIG. 3. A theoretical protection limit (i.e., a maximum threshold in this example) for the selected threshold 416 is a threshold protection limit ($Th_{PL}$) 418 defined by removing a first estimation error ($e_1$) 420 from the must-trip condition 414 (i.e., $Th_{PL}=C_{MT}-e_1$). The first estimation error 420 can be calculated by conducting a tolerance stack-up at the must-trip condition 414. Any monitor threshold selected at or below the threshold protection limit 418 could satisfy the protection requirements. However, as described below, the system nuisance limits define how far the selected threshold 416 should be set from the threshold protection limit 418.

In addition to protection requirements, monitors should accommodate foreseeable normal operating conditions without a nuisance trip. Therefore, monitor threshold robustness analysis may start by defining the must-not-trip condition ($C_{MNT}$) 406 after analyzing all foreseeable worst case system operating conditions during its expected service life. A threshold nuisance limit ($Th_{NL}$) 422, which is a minimum threshold in this example, can be defined by augmenting a second estimation error ($e_2$) 424 with the must-not-trip condition 406 (i.e., $Th_{NL}=C_{MNT}+e_2$). A tolerance stack-up can be conducted at the must-not-trip condition 406 to calculate the second estimation error 424. The first estimation error 420 and the second estimation error 424 may be calculated at respective operating points by a root sum of the squares (RSS) calculation or a worst-case tolerance analysis, i.e., the difference between actual operating conditions and controller/monitor estimates due to sensor errors, rigging errors, transmission backlash, accuracy, noise, cabling, and the like.

In the example of FIG. 4, as time 426 advances, a monitored signal 428 can change in value. While the monitored signal 428 may initially be within the system operating envelope 402, a transient event 430 may result in the monitored signal 428 temporarily exceeding the must-not-trip condition 406 and then returning to the system operating envelope 402. Upon experiencing an initiating event 432, the monitored signal 428 can again rise above the must-not-trip condition 406 and above the threshold nuisance limit 422 toward the selected threshold 416. Due to estimation errors, i.e., the second estimation error 424, the monitor 302 of FIG. 3 may actually start the confirmation counter 318 of FIG. 3 at an early start level 434 (e.g., $Th_{sel}-e_2$). With respect to the first estimation error 420, the monitor 302 of FIG. 3 can start the confirmation counter 318 of FIG. 3 at a late start level 436 (e.g., $Th_{sel}+e_1$). The selected confirmation time 322 of FIG. 3 can allow the monitored signal 428 to continue to increase past the threshold protection limit 418 for a maximum change in time ($\Delta t_{max}$) to the monitor trip point 438 that triggers a reaction, such as the fault response 328 of FIG. 3. The monitored signal 428 may continue to increase by a relatively small value until effects of the fault response 328 of FIG. 3, such as disabling the pump 330 of FIG. 3, are realized and the effects are contained at a containment level 440, where the monitored signal 428 can then decay.

The difference between the not-to-exceed condition 410 and the containment level 440 can be defined as protection headroom 442, which represents one embodiment of a protection margin. A reaction region 444 can be defined between the containment level 440 and the monitor trip point 438. A confirmation region 446 may be defined between the monitor trip point 438 and a start confirmation counter level (i.e., the late start level 436 in this example). A potentially valid range 448 for the selected threshold 416 can be defined between the late start level 436 and the early start level 434. A difference between the early start level 434 and the must-not-trip condition 406 can define nuisance headroom 450, which represents one embodiment of a nuisance margin.

Further in regard to FIG. 4, note that this example is for a monitor that trips upon exceeding "above" a fixed threshold. For monitors that trip "below" a fixed threshold (such as low voltage/current monitors), the protection and nuisance limits for thresholds become ($Th_{PL}=C_{MT}+e_1$) and ($Th_{NL}=C_{MNT}-e_2$) respectively. The derivation of $C_{MT}$, $C_{MNT}$, and stack-up error components ($e_1$, $e_2$) may involve expertise from different domains (e.g., component designers, sensor designers, system integrators) in order to increase the confidence factor in these estimations.

The nuisance risks can be further reduced by increasing the selected confirmation time ($D_{sel}$) 322 of FIG. 3 to accommodate foreseeable transients. A similar approach to the selection of thresholds can be followed for the selection of confirmation times. An upper limit can be defined by identifying the maximum duration tolerable by the monitored system 304 of FIG. 3 under failure conditions before the fault response needs to be triggered (i.e., latest must-trip condition). A lower time limit can also be defined by analyzing the worst case transients that monitors should tolerate without a trip under normal operating conditions (i.e., must-not-trip). Having accounted for timing tolerances in the system, the protection ($D_{PL}$) and nuisance ($D_{NL}$) limits for the selection of confirmation times can be calculated as maximum and minimum confirmation times.

Monitor thresholds should be selected to have a positive value of a protection margin ($M_P$) and a nuisance margin ($M_N$). These margins, $M_P$ and $M_N$ respectively, can be defined as percentages or ratios as follows in equations 1 and 2.

$$M_P=100*(Th_{PL}-Th_{sel})/(C_{MT}-C_{MNT}) \quad \text{(Eqn. 1)}$$

$$M_N=100*(Th_{sel}-Th_{NL})/(C_{MT}-C_{MNT}) \quad \text{(Eqn. 2)}$$

Calculated trip headroom ($H_N$) for the selected threshold should have a substantial margin. Trip headroom can be calculated according to equation 3.

$$H_N=100*(Th_{sel}-Th_{NL})/e_2 \quad \text{(Eqn. 3)}$$

While a simplified analysis may select a value for the selected threshold 416 as a midpoint between the not-to-exceed condition 410 and the must-not-trip condition 406, such a simplification can result in assigning a value for the selected threshold 416 that is too close to the threshold protection limit 418. In an exemplary embodiment, the selected threshold 416 is set to a value that is closer to the midpoint between the threshold protection limit 418 and the threshold nuisance limit 422, such that $M_P \approx M_N$.

Figure 5:
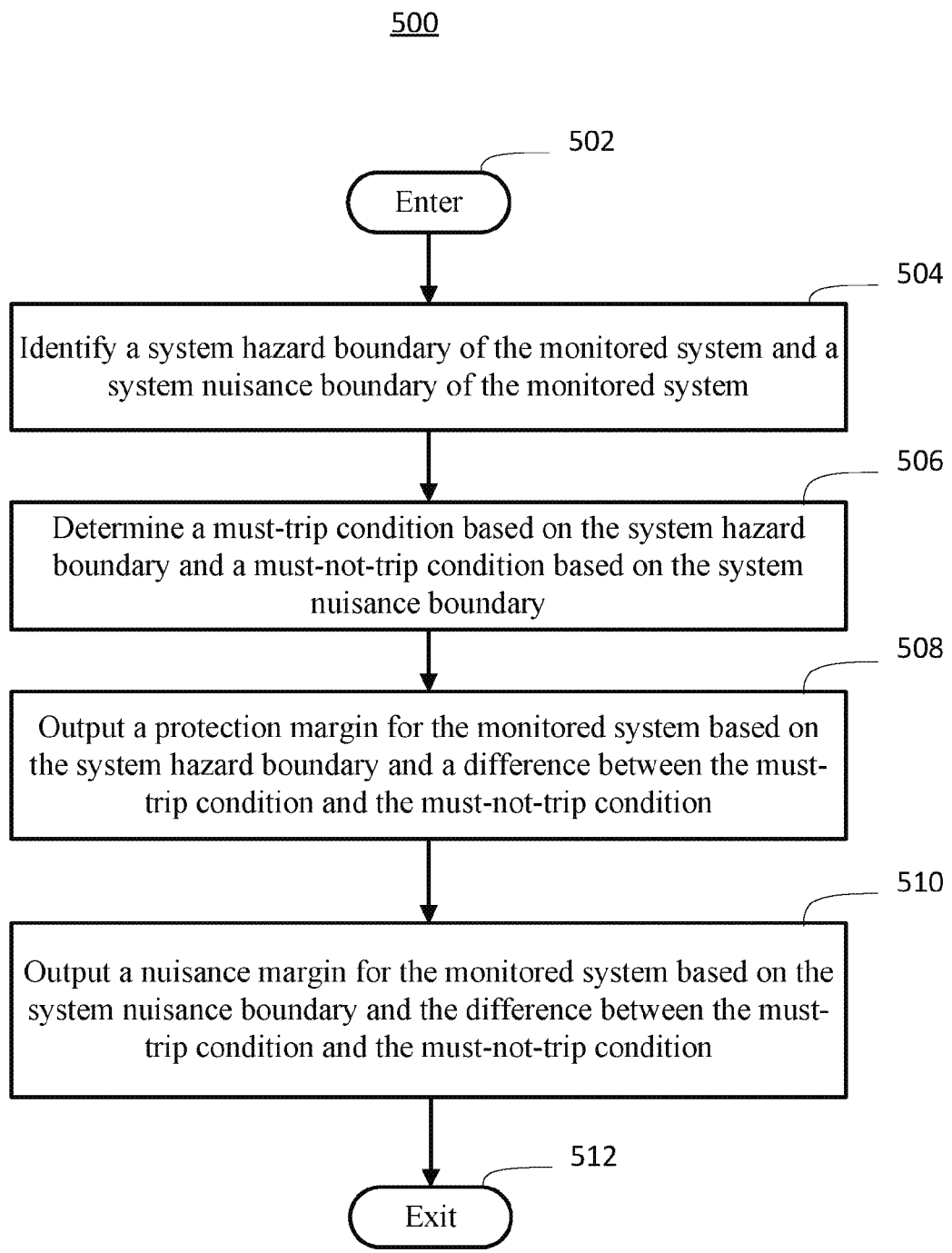
FIG. 5 is a flowchart of exemplary steps executed by a processor in a method for carrying out monitor performance analysis in accordance with embodiments of the present invention.

FIG. 5 is a flowchart of exemplary steps executed by a processor, such as the processor 205 of FIG. 2, in a method 500 for carrying out monitor performance analysis in accordance with embodiments of the present invention. The method 500 can be performed by execution of the MPA tool 116 of FIG. 1 to analyze the configuration of the monitor 302 for the monitored system 304 of FIG. 3. Accordingly, the method 500 of FIG. 5 is described in reference to FIGS. 1-5. After an enter step 502, a step 504 is executed in which a system hazard boundary 411 of a monitored system 304 and a system nuisance boundary 407 of the monitored system 304 are identified. At step 506, a must-trip condition 414 is determined based on the system hazard boundary 411 and a must-not-trip condition 406 based on the system nuisance boundary 407. At step 508, a protection margin ($M_P$) is output for the monitored system 304 based on the system hazard boundary 411 and a difference between the must-trip condition 414 and the must-not-trip condition 406. At step 510, a nuisance margin ($M_N$) is output for the monitored system 304 based on the system nuisance boundary 407 and the difference between the must-trip condition 414 and the must-not-trip condition 406. The method 500 exits at step 512.

Figure 6:
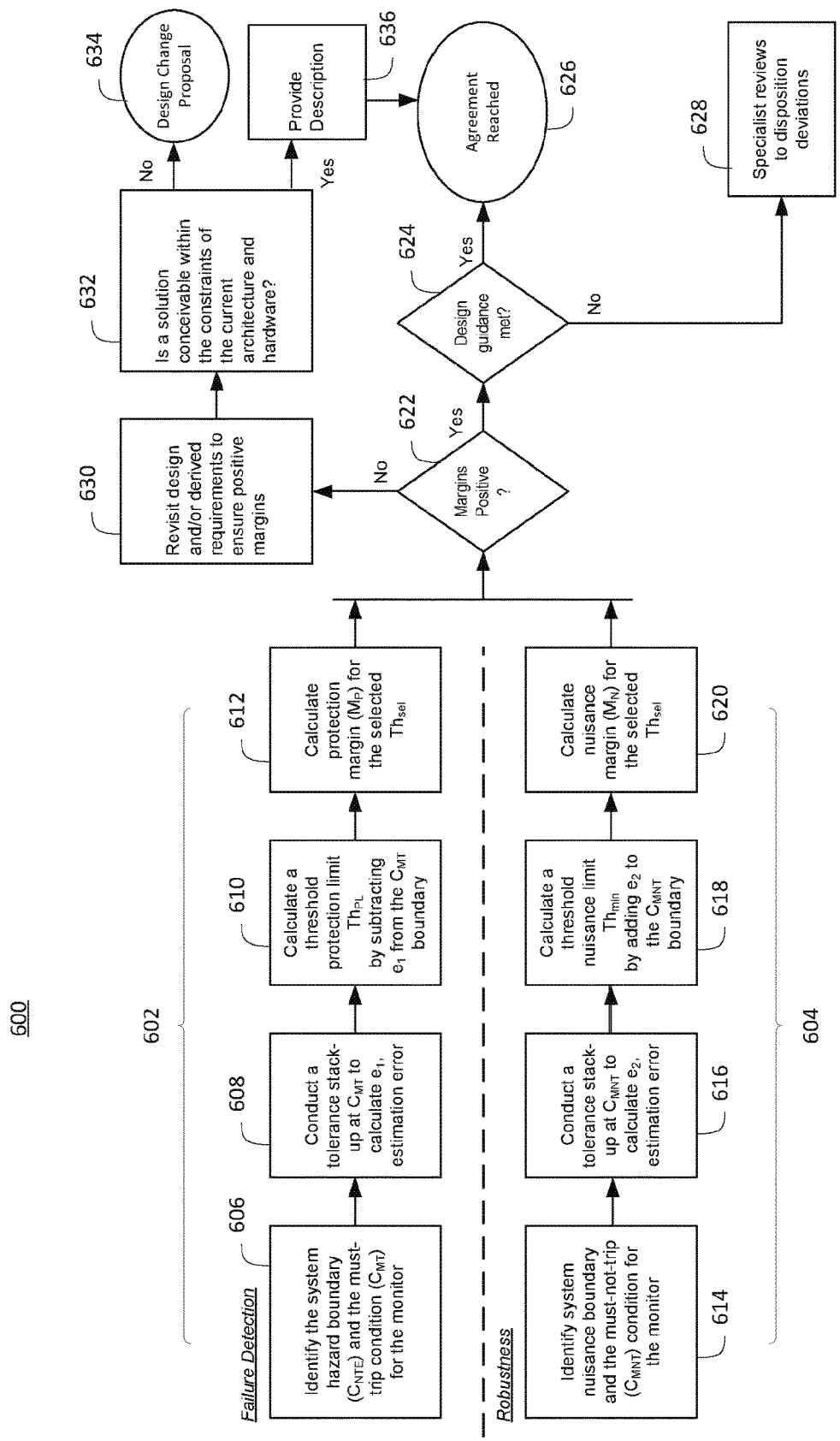
FIG. 6 is another flowchart of exemplary steps executed by a processor in a method for carrying out monitor performance analysis in accordance with embodiments of the present invention.

FIG. 6 is a flowchart of exemplary steps executed by a processor, such as the processor 205 of FIG. 2, in a method 600 for carrying out monitor performance analysis in accordance with embodiments of the present invention. The method 600 can be performed by execution of the MPA tool 116 of FIG. 1 to analyze the configuration of the monitor 302 for the monitored system 304 of FIG. 3. Accordingly, the method 600 of FIG. 6 is described in reference to FIGS. 1-6. The example of FIG. 6 is described for a selected threshold that is greater than a nominal level of operation for a monitored system. In the method 600, a failure detection group of steps 602 may be performed substantially in parallel, interleaved or in series with a robustness group of steps 604. The failure detection group of steps 602 may include steps 606, 608, 610, and 612. At step 606, a system hazard boundary 411 of the monitored system 304 is identified, and a must-trip condition 414 is determined based on the system hazard boundary 411. At step 608, a tolerance stack-up is conducted at the must-trip condition 414 to calculate a first estimation error 420. At step 610, a threshold protection limit 418 is calculated based on a difference between the must-trip condition 414 and the first estimation error 420. At step 612, a protection margin ($M_P$) for the monitored system 304 is calculated as a ratio of a difference between the threshold protection limit 418 and a selected threshold 416 divided by the difference between the must-trip condition 414 and the must-not-trip condition 406. The protection margin ($M_P$) can be multiplied by a value of one hundred to be expressed as a percentage.

The robustness group of steps 604 may include steps 614, 616, 618, and 620. At step 614, a system nuisance boundary 407 of the monitored system 304 is identified, and the must-not-trip condition 406 is determined based on the system nuisance boundary 407. In one embodiment, the system nuisance boundary 407 is equivalent to the must-not-trip condition 406. At step 616, a tolerance stack-up is conducted at the must-not-trip condition 406 to calculate a second estimation error 424. At step 618, a threshold nuisance limit 422 is calculated based on a difference between the must-not-trip condition 406 and the second estimation error 424. At step 620, a nuisance margin ($M_N$) for the monitored system 304 is calculated as a ratio of a difference between the selected threshold 416 and the threshold nuisance limit 422 divided by the difference between the must-trip condition 414 and the must-not-trip condition 406. The nuisance margin ($M_N$) can be multiplied by a value of one hundred to be expressed as a percentage.

At step 622, a margin check is performed of the selected threshold 416 relative to the threshold protection limit 418, and the selected threshold 416 relative to the threshold nuisance limit 422.

At step 624, a design guidance check is performed. The design guidance check can include confirming that a ratio of a difference between the selected threshold 416 and the threshold nuisance limit 422 divided by the second estimation error 424 exceeds a minimum value. The design guidance check can also include confirming that a selected confirmation time 322 exceeds a minimum confirmation value. The design guidance check may further include confirming that a difference between the protection margin ($M_P$) and the nuisance margin ($M_N$) is less than a margin difference threshold, such that $M_P$ and $M_N$ are substantially similar.

A corrective action can be initiated based on a determination that one or more of: the margin check and the design guidance check are not satisfied. The corrective action may be one of: a requirements change for the monitored system 304, a design change to the monitored system 304, or a reviewed and confirmed deviation. For example, if the margin check of step 622 and the design guidance check of step 624 are satisfied, then an agreement is reached at step 626. However, if the margin check of step 622 is satisfied but the design guidance check of step 624 is not satisfied, then one or more specialists may review the analysis results and disposition one or more deviations at step 628 relative to design guidance. If the margin check of step 622 is not satisfied, then the design and/or derived requirements of the design of the monitored system 304 and/or the monitor 302 are revisited at step 630 to ensure that positive margins can be achieved. At step 632, it is determined whether there is a solution that is conceivable within the constraints of the current architecture and hardware of the monitored system 304 and/or monitor. If there is no solution identified at step 632, then a design change proposal is made at step 634. If there is a solution identified at step 632, then a description of the solution is provided at step 636 and an agreement is reached at step 626.

The method 600 can also include confirming that a selected confirmation time 322 for the monitored system 304 is between a nuisance confirmation time limit and a protection confirmation time limit. Further, the method 600 can be repeated for multiple monitors and monitored system. Results of multiple iterations of the method 600 for multiple monitored systems can be recorded, for instance, as part of the MPA data 112 of FIG. 1.

Technical effects and benefits of embodiments include validation of levels and thresholds selected for system monitors. When selected thresholds or confirmation times are deemed unsatisfactory, further analysis may be performed to verify requirements and constraints or to determine an alternate solution. For example, a redesign process can be initiated to modify hardware and software architecture to enhance fault detection and/or robustness of the monitored system.

It will be appreciated that aspects of the present invention may be embodied as a system, method or computer program product and may take the form of a hardware embodiment, a software embodiment (including firmware, resident software, micro-code, etc.) or a combination thereof. Furthermore, aspects of the present invention may take the form of a computer program product embodied in one or more computer readable medium(s) having computer readable program code embodied thereon.

One or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In one aspect, the computer readable storage medium may be a tangible medium containing or storing a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The computer readable medium may contain program code embodied thereon, which may be transmitted using any appropriate medium, including but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. The program code may also be referred to as "computer program instructions" or more simply as "program instructions", such as the program instructions 216 of FIG. 2.

It will be appreciated that aspects of the present invention are described herein with reference to flowchart illustrations and/or block diagrams of methods, apparatus (systems) and computer program products according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed general purpose computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

What is claimed is:

1. A system, comprising:
    a processor;
    a memory system in communication with the processor, the memory system storing instructions that when executed by the processor result in the system being operable to:
        identify a system hazard boundary of a monitored system and a system nuisance boundary of the monitored system;
        determine a must-trip condition based on the system hazard boundary and a must-not-trip condition based on the system nuisance boundary;
        conduct a tolerance stack-up at the must-trip condition to calculate a first estimation error; and
        output a protection margin for the monitored system based on the system hazard boundary, the first estimation error and a difference between the must-trip condition and the must-not-trip condition; and
    a monitor of the monitored system, the monitor being configured to receive a monitored input from the monitored system, and, based on the monitored input, trip before the monitored system exceeds the system hazard boundary.

2. The system of claim 1, wherein the system is further operable to calculate a threshold protection limit based on a difference between the must-trip condition and the first estimation error.

3. The system of claim 2, wherein the protection margin for the monitored system comprises a ratio of a difference between the threshold protection limit and a selected threshold divided by the difference between the must-trip condition and the must-not-trip condition.

4. The system of claim 2, wherein the system is further operable to output a nuisance margin for the monitored system based on the system nuisance boundary and the difference between the must-trip condition and the must-not-trip condition.

5. The system of claim 4, wherein the system is further operable to conduct a tolerance stack-up at the must-not-trip condition to calculate a second estimation error.

6. The system of claim 5, wherein the system is further operable to calculate a threshold nuisance limit based on a difference between the must-not-trip condition and the second estimation error.

7. The system of claim 6, wherein the nuisance margin for the monitored system comprises a ratio of a difference between the selected threshold and the threshold nuisance limit divided by the difference between the must-trip condition and the must-not-trip condition.

8. The system of claim 7, wherein the system is further operable to perform a margin check of the selected threshold relative to the threshold protection limit and the selected threshold relative to the threshold nuisance limit.

9. The system of claim 8, wherein the system is further operable to perform a design guidance check to confirm that a ratio of a difference between the selected threshold and the threshold nuisance limit divided by the second estimation error exceeds a minimum value.

10. The system of claim 9, wherein the design guidance check further comprises confirming that a selected confirmation time exceeds a minimum confirmation value.

11. The system of claim 10, wherein the design guidance check further comprises confirming that a difference between the protection margin and the nuisance margin is less than a margin difference threshold.

12. The system of claim 11, wherein a corrective action is initiated based on a determination that one or more of the margin check and the design guidance check are not satisfied.

13. The system of claim 12, wherein the corrective action is one of: a requirements change for the monitored system, a design change to the monitored system, or a reviewed and confirmed deviation.

14. The system of claim 1, wherein the monitored system is a control system of an aircraft.

15. The system of claim 1, wherein the system is further operable to confirm that a selected confirmation time for the monitored system is between a nuisance confirmation time limit and a protection confirmation time limit.

16. The system of claim 1, wherein the system is further operable to record results for multiple monitored systems.

17. A method for performance analysis of a monitor of a monitored system, the method comprising:
identifying a system hazard boundary of the monitored system and a system nuisance boundary of the monitored system;
determining a must-trip condition based on the system hazard boundary and a must-not-trip condition based on the system nuisance boundary;
conducting a tolerance stack-up at the must-trip condition to calculate a first estimation error;
outputting a protection margin for the monitored system based on the system hazard boundary, the first estimation error and a difference between the must-trip condition and the must-not-trip condition;
receiving, at the monitor of the monitored system, a monitored input from the monitored system; and
causing tripping of the monitor before the monitored system exceeds the system hazard boundary based on the monitored input.

18. The method of claim 17, further comprising:
calculating a threshold protection limit based on a difference between the must-trip condition and the first estimation error.

19. The method of claim 18, wherein the protection margin for the monitored system comprises a ratio of a difference between the threshold protection limit and a selected threshold divided by the difference between the must-trip condition and the must-not-trip condition.

20. The method of claim 18, further comprising:
outputting a nuisance margin for the monitored system based on the system nuisance boundary and the difference between the must-trip condition and the must-not-trip condition.

21. The method of claim 20, further comprising:
conducting a tolerance stack-up at the must-not-trip condition to calculate a second estimation error.

22. The method of claim 21, further comprising:
calculating a threshold nuisance limit based on a difference between the must-not-trip condition and the second estimation error.

23. The method of claim 22, wherein the nuisance margin for the monitored system comprises a ratio of a difference between the selected threshold and the threshold nuisance limit divided by the difference between the must-trip condition and the must-not-trip condition.

24. The method of claim 23, further comprising:
performing a margin check of the selected threshold relative to the threshold protection limit and the selected threshold relative to the threshold nuisance limit.

25. The method of claim 24, further comprising:
performing a design guidance check to confirm that a ratio of a difference between the selected threshold and the threshold nuisance limit divided by the second estimation error exceeds a minimum value.

26. The method of claim 25, wherein the design guidance check further comprises confirming that a selected confirmation time exceeds a minimum confirmation value.

27. The method of claim 26, wherein the design guidance check further comprises confirming that a difference between the protection margin and the nuisance margin is less than a margin difference threshold.

28. The method of claim 27, wherein a corrective action is initiated based on a determination that one or more of the margin check and the design guidance check are not satisfied.

29. The method of claim 28, wherein the corrective action is one of: a requirements change for the monitored system, a design change to the monitored system, or a reviewed and confirmed deviation.

30. The method of claim 17, wherein the monitored system is a control system of an aircraft.

31. The method of claim 17, further comprising:
confirming that a selected confirmation time for the monitored system is between a nuisance confirmation time limit and a protection confirmation time limit.

32. The method of claim 17, further comprising:
recording results for multiple monitored systems.

33. A computer program product for performance analysis of a monitor of a monitored system, the computer program product comprising a computer readable storage medium having program code embodied therewith, the program code readable/executable by a computer, processor or logic circuit to perform a method comprising:
identifying a system hazard boundary of the monitored system and a system nuisance boundary of the monitored system;
determining a must-trip condition based on the system hazard boundary and a must-not-trip condition based on the system nuisance boundary;
outputting a protection margin for the monitored system based on the system hazard boundary and a difference between the must-trip condition and the must-not-trip condition; and
causing tripping of the monitor before the monitored system exceeds the system hazard boundary based on a monitored input from the monitored system.

34. A system comprising:
a processor;
a memory system in communication with the processor, the memory system storing instructions that when executed by the processor result in the system being operable to:
identify a system hazard boundary of a monitored system and a system nuisance boundary of the monitored system;
determine a must-trip condition based on the system hazard boundary and a must-not-trip condition based on the system nuisance boundary;
confirm that a selected confirmation time for the monitored system is between a nuisance confirmation time limit and a protection confirmation time limit; and
output a protection margin for the monitored system based on the system hazard boundary and a difference between the must-trip condition and the must-not-trip condition; and
a monitor of the monitored system, the monitor being configured to receive a monitored input from the monitored system, and, based on the monitored input, trip before the monitored system exceeds the system hazard boundary.

35. A method for performance analysis of a monitor of a monitored system, the method comprising:
identifying a system hazard boundary of the monitored system and a system nuisance boundary of the monitored system;

determining a must-trip condition based on the system hazard boundary and a must-not-trip condition based on the system nuisance boundary;

confirming that a selected confirmation time for the monitored system is between a nuisance confirmation time limit and a protection confirmation time limit;

outputting a protection margin for the monitored system based on the system hazard boundary and a difference between the must-trip condition and the must-not-trip condition;

receiving, at the monitor of the monitored system, a monitored input from the monitored system; and causing tripping of the monitor before the monitored system exceeds the system hazard boundary based on the monitored input.

* * * * *